Dec. 9, 1924.                                                          1,518,434
E. A. KLEIN
FUMIGATING TENT
Filed Dec. 19, 1923                    2 Sheets-Sheet 1
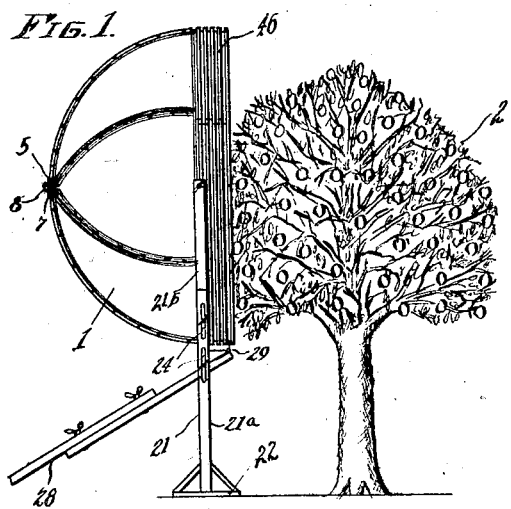
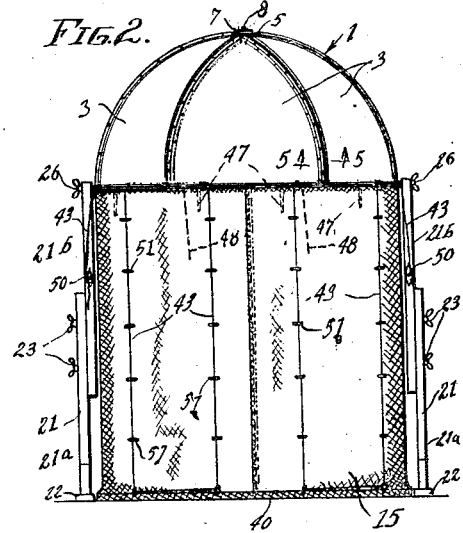
Inventor
Emil A. Klein
By Lyon & Lyon
Attorneys

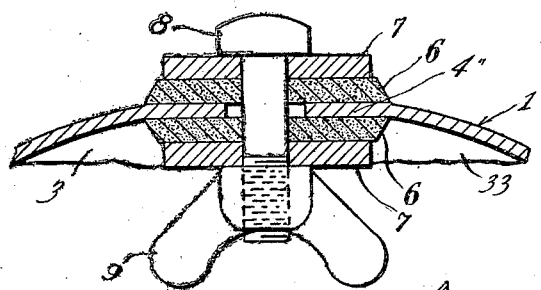
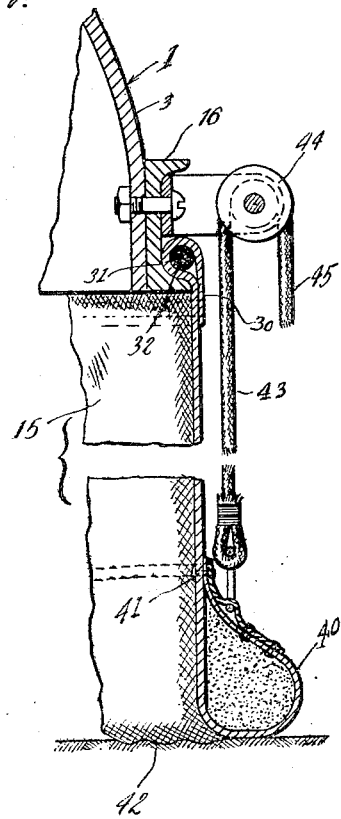
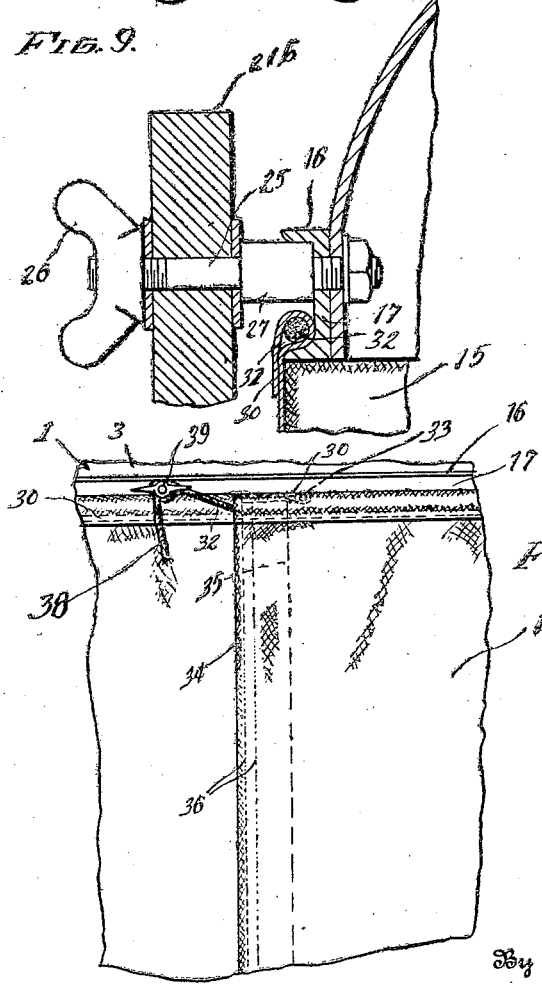

Patented Dec. 9, 1924.

1,518,434

UNITED STATES PATENT OFFICE.

EMIL A. KLEIN, OF LOS ANGELES, CALIFORNIA.

FUMIGATING TENT.

Application filed December 19, 1923. Serial No. 681,553.

*To all whom it may concern:*

Be it known that I, EMIL A. KLEIN, a citizen of the United States, residing at Los Angeles, in the county of Los Angeles and State of California, have invented a new and useful Fumigating Tent, of which the following is a specification.

This invention relates to a fumigating tent to be used for facilitating the fumigation of plants or trees bearing fruit. Such fumigating tents are set in position over the tree or plant to be fumigated, so as to envelop the same, and operate to confine the fumigating gases around it. One of the difficulties arising in the use of such a tent is that if it rests upon the branches of the tree, the efficiency of the fumigating operation is interfered with, and furthermore, the tree or fruit may be injured by the contact with the fumigating tent. Another difficulty arises in sealing the lower edge of the tent at the ground line, which is necessary to prevent the escape of the fumigating gas.

The general object of this invention is to produce a fumigating tent of simple construction, which can be readily applied to the plant or tree to be fumigated and which can be operated without resting on the branches of the tree; also to provide a tent of this kind with means for effectively sealing the lower edge of the tent at the ground line.

Further objects of the invention will appear hereinafter.

The invention consists in the novel features and combination of parts to be described hereinafter, all of which contribute to produce an efficient fumigating tent.

A preferred embodiment of the invention is described in the following specification, while the broad scope of the invention is pointed out in the appended claims.

In the drawings:

Fig. 1 is a side elevation illustrating a tree with one of my fumigating tents set up alongside of the same and ready to be applied over the tree;

Fig. 2 is a side elevation showing the tent completely set up, as in use;

Fig. 3 is a view similar to Figure 2, but showing the tent as viewed from another side;

Fig. 4 is a side elevation illustrating one of the elements or sectors which I prefer to employ in constructing the dome of the tent;

Fig. 5 is a horizontal section taken through the dome at one of the joints between the sectors. This section is taken on line 5—5 of Figure 2;

Fig. 6 is a fragmentary side elevation showing a portion of the lower edge of the tent at the joint or connecting point between two adjacent elements or sectors;

Fig. 7 is a vertical section taken through the lower edge of the dome and through the skirt of the tent, illustrating details of the construction, and particularly the feature of the invention which facilitates producing a seal at the ground line. This view is upon an enlarged scale and partially broken away;

Fig. 8 is a side elevation showing a portion of the lower edge of the dome and further illustrating details of the construction where the skirt or lower portion of the tent is connected to the dome. This view is upon an enlarged scale;

Fig. 9 is a vertical section upon an enlarged scale and particularly illustrating the construction at the point of support for the dome; this view also further illustrates the means for supporting the skirt on the dome;

Fig. 10 is a vertical section on an enlarged scale taken at the apex of the dome; and Fig. 11 is a horizontal section similar to Fig. 5 but showing a modification.

In practicing the invention, I provide a dome 1, which is preferably constructed of light sheet metal. If it is desired to have this dome extremely light, it can be constructed of aluminum. However, it may be constructed of light sheet steel, brass or any other sheet metal of light gage. It is unnecessary to have this material of heavy gage because of the concavo-convex or hemispherical shape of the dome. This shape operates to give the dome the desired stiffness and at the same time enables the dome to fit the circular contour of a tree 2 over which the tent is used. The dome is preferably constructed of a plurality of concavo-convex, sector-shaped elements or sectors 3 which are arcuate in form at their lower edges, and which are of substantially triangular outline so that each sector forms a point 4 at its upper end. These points 4 meet together and form the apex 5 of the dome, at which point I provide washers 6 of soft compressible material (see Fig. 10), disposed respectively on the upper side and under side of the sectors, and clamped in place between two plates 7 by means of a clamping bolt 8 with a wing-nut 9 on its inner side.

The side edges 10 of the sectors are connected together, and between the attached edges 10, I provide gaskets which insure that the dome will be substantially gas tight. In order to accomplish this and at the same time give the dome a desirable stiffness, I provide the edges 10 with small outwardly projecting flanges 11, which may be part of angle irons 12 bent to the proper curve and riveted along the edges of the sectors. Between the flanges 11, I provide the gaskets 13 and connect the flanges together by removable bolts 14 (see Fig. 5).

Supported from the lower edge of the dome, I provide a flexible skirt 15 which may be made of duck, canvas or any other suitable fabric. This skirt completely envelopes the space below the dome, excludes the air and confines the gases. In order to complete the construction of the dome and facilitate the supporting of the skirt 15, I provide the lower edge of the dome with a ring 16, which is preferably formed of channel iron, the web 17 of which is riveted to the lower edge of the dome (see Figs. 8 and 9). This ring is, of course, made in sections to correspond with the sectors 3, (see Fig. 4).

At the point where the sections of the ring 16 come together, one of the meeting ring sections has its flanges 18 cut away so as to leave the web of the ring section projecting outwardly in the form of a tongue 19, (see Fig. 6). Each tongue overlaps the adjacent part of web 17, and is secured to it by a removable bolt 20.

I provide suitable means for supporting the dome, which operates to support the same in such a way that it can be held in a tilted position such as illustrated in Figure 1, when being applied to the tree, and so that the dome may be swung over the tree. In order to accomplish this, I provide two oppositely disposed posts 21 (see Fig. 2), which are provided with a foot 22 at the bottom to rest upon the ground. In order to adapt the tent to be used with trees of different heights, these posts 21 are formed of two sections 21$^a$ and 21$^b$ connected together by clamping screws 23 running in slots 24.

The channel ring 16 is supported on these posts 21 at two diametrically opposite points by means of two pivot bolts 25 (see Fig. 9), provided with wing-nuts 26 for clamping the same to secure the dome rigidly to the posts in the position shown in Fig. 1 or in the operating position shown in Fig. 2. These clamping bolts 25 have enlarged heads 27, and the upper end of each section 21$^b$ is clamped between this head and the wing-nut.

In order to prevent the tent, when set up, from being tipped over easily, I provide a third post 28 (see Fig. 3), which is located half way between the other two posts, and the upper end of this post is connected by a hinge connection 29 to the side of the ring 16 (see Figs. 1 and 3). This post is constructed in two sections, so that it is extensible like the posts 2.

The skirt 15 is formed of a sheet of duck, canvas or similar material, which extends around the lower edge of the dome. In order to facilitate its attachment to the dome and to insure a gas-tight connection, I provide the upper edge of the skirt with a hem 30 (see Fig. 7) which forms a continuous sleeve 31, and receives a cord or cable 32 of flexible wire such as picture cord. One end of this wire is provided with a loop anchored to a pin 33 on the web 17 of the ring 16 (see Fig. 8), located near the point where the vertical edges 34 and 35 of the skirt come together. These edges 34 and 35 are overlapped and permanently attached together by stitching 36 which extends up from the lower edge of the skirt, but does not extend across the sleeve 31. I let the loose end 38 of the cord or cable 32 project out (see Fig. 8). When the skirt is put in place, the cord 32 should be pulled tight, and the loose end 38 is then wrapped around a cleat 39 on the ring. The skirt 15 is suspended on the lower flange of the ring 16, and the weight of the skirt pulling upon the sleeve 31 and the cable 32, insures that a tight joint will be formed at the upper edge of the tent.

If desired the flanges at the edges of the sectors 3 may be placed on the inside, see Fig. 11, in which flanges 11$^a$ of angle irons 12$^a$ are connected by bolts 14$^a$ to clamp the gasket 13$^a$.

Suitable means are provided for insuring that the lower edge of the skirt will be sealed at the ground line to prevent escape of the fumes. In order to accomplish this, I provide annular yielding means at the lower edge of the skirt, which is so constructed that it adapts itself to the contour of the ground line and maintains contact with the ground line at all points. In order to accomplish this, I prefer to provide an annular cushion 40 along its lower edge (see Fig. 7), which is formed by turning up the outer edge of the skirt and securing the same along a line 41. This cushion 40 is filled with a freely flowing substance, such as sand, which operates to engage yieldingly with the ground line 42 and insures a gas-tight joint, so that when the cushion 40 rests by its own weight on the ground, an effective sealing will be formed at this point.

In order to facilitate the folding up of the skirt, when it is desired to remove the tent from a tree which has been fumigated, I provide a plurality of lifting cords or cables 43, which are attached at the lower end of the cushion 40 and extend around pulleys or sheaves 44, which are attached to suitable brackets on the outer side of the ring. By pulling up on the loose ends 45 of these cords, the cushion can be elevated to a position near the ring 16. In doing this, the person operating the tent should see to it that the skirt disposes itself in a plurality of folds 46. In order to hold the folded skirt in position when the tent dome is in the tilted position illustrated in Figure 1, I provide a plurality of guide bars or stems 47 (see Fig. 4). These guide bars are long bolts which extend down from the lower flange of the ring 16 and lie just inside of the folds 46. Cords 48 are carried by the ring near the guides 47, and these are employed to tie up the folds, by attaching the loose ends of the same to cleats similar to cleat 39 already described. If desired, instead of letting the cords 43 hang loose, as illustrated in Figure 7, they may be guided over to a point near the post 28, passing around guide pulleys 49 (see Fig. 3) and thence down to a point near a cleat 50. By providing such lifting cords at each side of the tent, two persons can readily raise and fold the skirt, as described above. The cords 43 may be guided through rings or guide loops 51 attached to the outer side of the skirt.

It is understood that the embodiment of the invention described herein is only one of the many embodiments this invention may take and I do not wish to be limited in the practice of my invention nor in my claims to the particular embodiment set forth.

What I claim is:

1. In a fumigating tent, the combination of a rigid dome constructed to operate as a covering for a tree, means for supporting the same, and a folding skirt carried by and suspended from the dome, said skirt operating to completely envelope the space below the dome and exclude the air therefrom.

2. In a fumigating tent the combination of a rigid dome, means for supporting the same, a folding skirt carried by and suspended from the dome, and annular yielding means other than the skirt and carried at the lower edge of the skirt to rest upon the ground and constructed to adapt itself to the contour of the ground-line so as to seal the lower edge of the skirt.

3. In a fumigating tent, the combination of a rigid dome consisting of a plurality of sectors connected together at their edges, a ring composed of sections attached respectively to the lower edges of said sectors, a skirt supported in said ring and suspended from the dome, and means for movably supporting the dome to enable the same to be swung over the tree to be fumigated.

4. In a fumigating tent, the combination of a rigid dome of substantially hemispherical form, a skirt suspended from the edge of the dome and having a bag formed at the lower end thereof containing a freely flowing substance and operating to rest upon the ground to seal the lower edge of the skirt at the ground.

5. In a fumigating tent, the combination of a rigid dome of substantially hemispherical form having a ring secured at the edge thereof, a skirt extending continuously along the ring and having a sleeve adjacent to the ring, an endless cable disposed in the sleeve and securing the skirt to the ring, and means for supporting the dome.

6. In a fumigating tent, the combination of a rigid dome of substantially hemispherical form, a ring consisting of a channel-iron extending around the lower edge of the dome, a skirt extending continuously along the edge of the dome and having a sleeve with a cable disposed within the same lying in the channel and supporting the skirt on the ring.

7. In a fumigating tent, the combination of a dome composed of sector-shaped concavo-convex plates connected together at their adjacent edges, gaskets between the connected edges of the sectors, means for supporting the dome, and a skirt secured to the lower edge of the dome and extending to the earth.

8. In a fumigating tent, the combination of a dome composed of a plurality of sector-shaped concavo-convex plates, having flanges at their edges, gaskets between the flanges, means for clamping the sectors together at the flanges, means for supporting the dome, and a skirt secured to the lower edge of the dome and extending to the earth.

9. A fumigating tent having a skirt with an annular cushion formed at the lower edge thereof, said cushion carrying a filler of freely flowing substance and operating to rest upon the ground and adapt itself to the contour of the ground-line so as to form a seal for the lower edge of the skirt.

Signed at Los Angeles, Calif., this 13th day of December, 1923.

EMIL A. KLEIN